(12) United States Patent
Zhu et al.

(10) Patent No.: US 12,361,492 B2
(45) Date of Patent: Jul. 15, 2025

(54) COUNTERFACTUAL NEURAL NETWORK LEARNING FOR CONTEXTUAL ENHANCED EARNINGS CALL ANALYSIS

(71) Applicant: International Business Machines Corporation, Armonk, NY (US)

(72) Inventors: Yada Zhu, Irvington, NY (US); Wei Zhang, Acton, MA (US); Xiaodong Cui, Chappaqua, NY (US); Guangnan Ye, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 17/315,764

(22) Filed: May 10, 2021

(65) Prior Publication Data

US 2022/0358594 A1 Nov. 10, 2022

(51) Int. Cl.
| | |
|---|---|
| G06Q 40/06 | (2012.01) |
| G06F 40/20 | (2020.01) |
| G06N 3/045 | (2023.01) |
| G06N 3/09 | (2023.01) |
| G06N 20/00 | (2019.01) |

(52) U.S. Cl.
CPC ............ *G06Q 40/06* (2013.01); *G06F 40/20* (2020.01); *G06N 3/045* (2023.01); *G06N 20/00* (2019.01); *G06N 3/09* (2023.01)

(58) Field of Classification Search
CPC ........ G06Q 40/06; G06N 20/00; G06N 3/045; G06F 40/20
See application file for complete search history.

(56) References Cited

U.S. PATENT DOCUMENTS

| 7,555,257 B2 | 6/2009 | Grossman et al. | |
| 2021/0327411 A1* | 10/2021 | Wu | ................... G06F 40/284 |
| 2023/0066452 A1* | 3/2023 | Baykaner | ............ H04L 67/1095 |

FOREIGN PATENT DOCUMENTS

| CN | 106384166 A | 2/2017 |
| CN | 108647828 A | 10/2018 |
| KR | 102104316 B1 | 10/2019 |
| KR | 102146546 B1 | 5/2020 |

OTHER PUBLICATIONS

Ma et al. Towards Earnings Call and Stock Price Movement. 2020. (Year: 2020).*
Devlin et al. BERT: Pre-training of Deep Bidirectional Transformers for Language Understanding. 2019 (Year: 2019).*

(Continued)

*Primary Examiner* — Michelle T Bechtold
*Assistant Examiner* — Robert Bejcek, II
(74) *Attorney, Agent, or Firm* — Scully, Scott, Murphy & Presser, P.C.; Robert D. Bean

(57) ABSTRACT

A machine learning model can be trained to predict one or more financial indicators using earnings call transcripts augmented with counterfactual information. Using faithful gradient-based method, prediction results with respect to a particular counterfactual information can be explained. Based on the explanation, the counterfactual information determined to have most impact on prediction results can be selected for updating the machine learning model.

19 Claims, 7 Drawing Sheets

(56) References Cited

OTHER PUBLICATIONS

Macdonald et al. About Learning Models with Multiple Query-Dependent Features. ACM Transactions on Information Systems, vol. 31, No. 3, Article 11, Publication date: Jul. 2013. (Year: 2013).*
Mothilal et al. Explaining Machine Learning Classifiers through Diverse Counterfactual Explanations. FAT* '20, Jan. 27-30, 2020, Barcelona, Spain © 2020 Association for Computing Machinery. (Year: 2020).*
Zagoruyko et al. Paying More Attention to Attention: Improving the Performance of Convolutional Neural Networks via Attention Transfer. ICLR 2017. (Year: 2017).*
Lee, H., et al., "Does Implementation of Big Data Analytics Improve Firms' Market Value? Investors' Reaction in Stock Market", Sustainability 2017, Apr. 9, 2017, Accepted Jun. 3, 2017, Published Jun. 9, 2017, 17 pp. 9, 978.
Yang, Y, et al., "Generative Data Augmentation for Commonsense Reasoning", arXiv:2004.11546v3, Nov. 17, 2020, 18 pages.
Qin, Y., et al., "What You Say and How You Say It Matters: Predicting Financial Risk Using Verbal and Vocal Cues", Proceedings of the 57th Annual Meeting of the Association for Computational Linguistics, Jul. 28-Aug. 2, 2019, pp. 390-401.
NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

COUNTERFACTUAL NEURAL NETWORK LEARNING FOR CONTEXTUAL ENHANCED EARNINGS CALL ANALYSIS

BACKGROUND

The present application relates generally to computers and computer applications, and more particularly to machine learning for contextually enhanced analysis and prediction.

Supervised machine learning uses data such as historical data to learn to predict or classify newly seen information. Not all practical real-world scenarios, however, have enough data to be able to train a machine. For instance, insufficient training data samples may mean that a model so trained may not accurately make predictions or classifications for its purpose.

An earnings call is a conference call (typically held in the form of a teleconference or a webcast) during which the management of a public company announces and discusses the financial results of a company for a quarter or a year. Generally, the earnings call is accompanied by an official press release that summarizes the key points of a company's financial performance.

Earnings calls are considered one of the key resources for investors and equity analysts. The information provided during earnings calls can be incorporated into the fundamental analysis of a company. In fundamental analysis, analysts can combine the information obtained during the event with the information presented in the management, discussion, and analysis (MD&A) section of the company's reports.

The importance of earnings calls is acknowledged by the fact that investors frequently plan their trades close to the date of an upcoming conference. Equity analysts use the information provided during such events to update their earnings estimates.

BRIEF SUMMARY

The summary of the disclosure is given to aid understanding of a computer system and method of counterfactual e-net learning for contextual enhanced earning call analysis, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method and system can be provided for contextual neural network learning. A method, in an aspect, can include receiving training data including financial indicators and corresponding earnings call data. The method can also include, training, using the training data, a first machine learning language model to determine context of an earnings call of associated with an entity and based on the context to predict a financial indicator associated with the entity. The method can also include receiving counterfactual data and augmenting the earnings call data with the counterfactual data. The method can further include training, using the augmented earnings call data and the financial indicators in the training data, a second machine learning language model. The method can also include obtaining gradient of a loss function of the first machine learning language model toward the input data of the first machine learning language model. The method can also include obtaining gradient of a loss function of the second machine learning language model toward the input data of the second machine learning language model. The method can further include, based on a difference between the gradient of a loss function of the first machine learning language and the gradient of a loss function of the second machine learning language model, providing an explanation of an impact of the counterfactual data on performance of the first machine learning language model.

In an aspect, training the second machine learning language model can be repeated using different counterfactual data, and a counterfactual data determined to have most impact on the performance of the first machine learning language model can be selected, and the first machine learning language model's weights can be updated based on a difference between the gradient of a loss function of the first machine learning language model and the gradient of a loss function of the second machine learning language model trained with the selected counterfactual data.

A system including a processor configured to at least perform one or more methods described herein can also be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
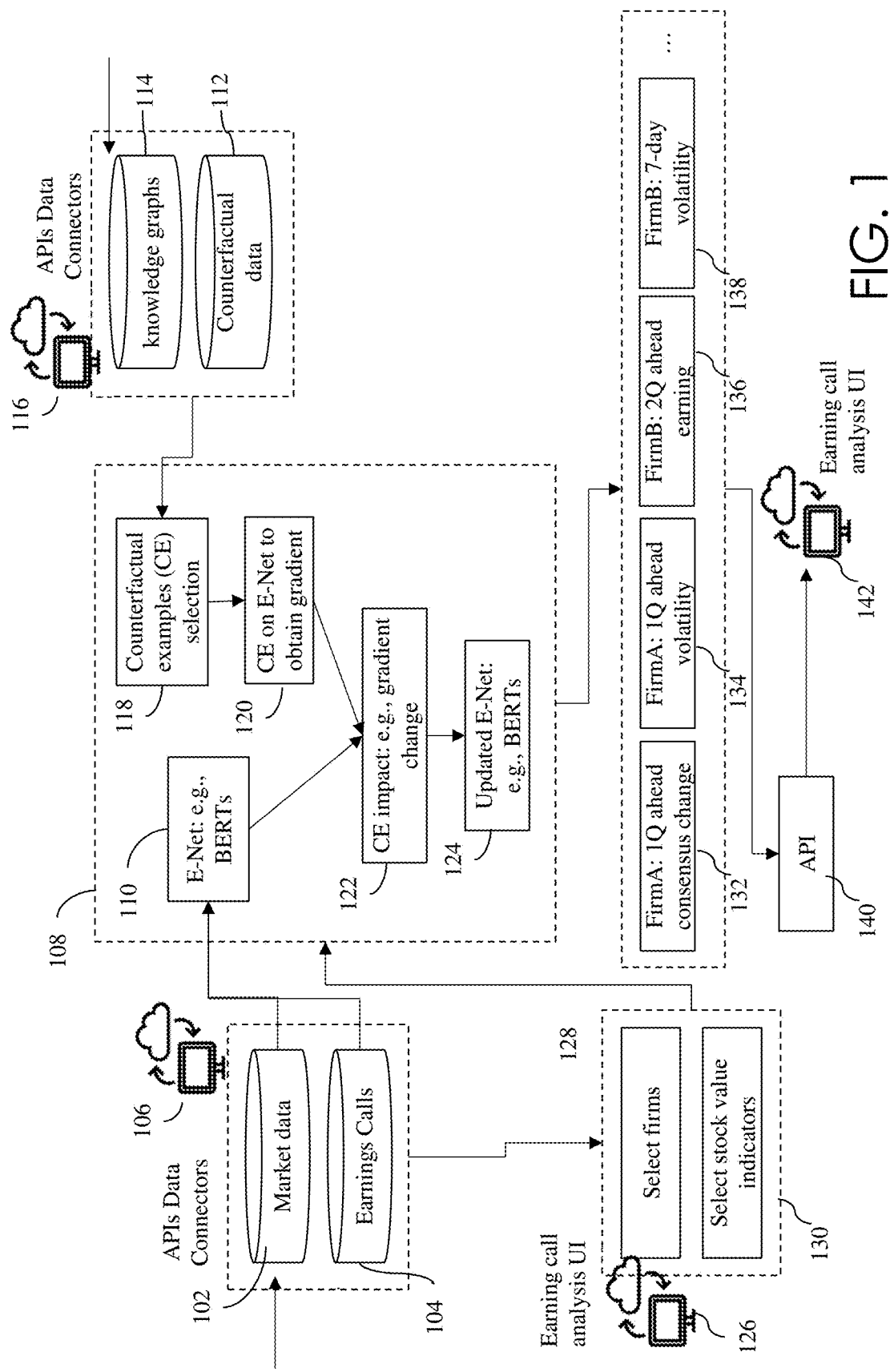
FIG. 1 is a diagram illustrating components and example method flow in an embodiment for counterfactual learning for earning call analysis.

Machine learning can be employed to facilitate financial analysis such as predicting a company's future earning, stock value, return, trend, and the like. Earnings call transcripts can contain useful information in developing machine learning models performing such financial predictions. A natural language processing (NLP) model can parse and analyze text data or speech data contained in earnings call transcripts, to help in estimating or predicting of financial information about a company. It is noted, however, that an earning call transcript is typically longer than other types of documents (e.g., greater than 500 sentences) such as news or reviews, and therefore, makes the natural language processing (NLP) model harder to learn the semantic structure from the documents. Further, the earning call is a document in real world scenario which contains many noisy sentences (e.g., good morning, how are you, etc.), thus making the machine learning model more difficult to pinpoint the most salient sentences in the documents. Moreover, earning call analysis has a limited number of training documents, e.g., since an earning call occurs once per quarter. For instance, for a 10-year public company, there may only be 40 samples.

In one or more embodiments, a system and method can be provided, by way of machine learning, to analyze the impact of public company's earnings calls to stock or financial values. In an embodiment, the system and/or method may train a machine learning model such as a neural network, predict stock values using earning call transcripts augmented with counterfactual information from analyst or investment firms such as news, public commentary notes, media, and/or others, to improve prediction performance. In an embodiment, the augmentation method is faithful gradient-based, e.g., influence function (IF), TranIN, weighted gradient, and/or the like. In a faithful gradient-based method, calculations can be based on a single final optimized model. A faithful method explains prediction results with respect to counterfactual examples. Influence function (IF) provides the effect on an estimator of changing one point of the sample. TranIN includes tracing gradient descent by (a) a first-order gradient approximation to the exact computation, (b) saved checkpoints of standard training procedures, and (c) cherry-picking layers of a deep neural network. Based on the explanation, the system and/or method may select impactful counterfactual examples to augment valuable information.

In a specific example, the system and/or method can use earnings call transcripts to predict analysts' consensus change on sales growth prediction zero quarter ahead. For example, a system leverages the current earnings call report to estimate the analysts' change of consensus for the current quarter when the earnings call report is held. Such estimation may correlate with macro market adjustments, and it can serve as an indicator/feature to downstream machine learning tools. For instance, a target estimation can be classified into 3 classes, 1 (if analysts consensus increases), 0 (decreases) and −1 (decreases) within a threshold [−δ, δ] which is determined to balance the three classes.

The system and/or method, in an aspect, addresses an issue of limited training samples via data augmentation. The data augmentation method leverages impactful training examples based on an explanatory artificial intelligence (AI) technique. The system and/or method also leverages news and other contextual information to improve performance of earning call analysis.

Lack of deep understanding of the earnings call transcript, considering that the transcript is usually long (5000 words on average) and noisy (including redundant information that barely relates to market performance) can contribute to less than optimal machine learning models being produced or trained. The system in an embodiment can address the problem by enhancing the earnings call representation by directing a language model to put more attention on relatively more informative texts than the less informative ones, automatically. In this way, it can be explained whether an earnings call as its entirety truly contain information that can suggest consensus change. In an embodiment, the system leverages the standard Transformers architecture to encode texts and compare two settings: 1) A Baseline: Encoding the entire earning call transcript as a concatenated word sequence with BERT ((Bidirectional Encoder Representations from Transformers), then classify the sequence representation using special token "[CLS]" as the word sequence representation; and 2) Knowledge-enhanced Earning Call Representation: the system uses news articles to produce a representation that encodes the "important contents" that a company may be sensitive to, and then use the representation to "attend to" the word sequence of earning calls.

News enhanced earning calls, for example, as in 2) above, helps a model discern salient information in the earnings call to be used for prediction. News title can contain such condensed information. For instance, for a company c, the system may extract its news title set $W=w_j(t)$ where each $w_j(t)$ is the j-th piece of news at time t.

The system and/or method in an embodiment performs counter-factual earnings call transcript learning with news learning awareness. For example, a system may learn earnings call using news as attention (not necessarily its contents) and observe how appending news to earnings call changes the understanding of an earnings call.

In an embodiment, the system and/or method build on top of two ideas to address the representation learning problem: 1) the system learns news net (n-net, e.g., neural network) and earning calls net (e-net, e.g., neural network) separately, while each net's learning is aware of the learning of another. In an embodiment, the information sharing between the two nets is by network gradients to facilitate attention transfer but not actual knowledge transfer. Such an idea relates to the idea of competitive multi-agent learning with opponent learning awareness; and 2) the system uses a method called counter-factual learning, where the "credit" of the gradient from the other is determined by the answer to this question: "what if the system concatenates the news in e-net input? how does that change an earnings call's representation?" In an embodiment, the system does this by applying a neural network explainability metric of input gradient to observe earnings calls importance change before and after news is included (thus, counter-factual). The system can use such importance difference to guide how much news gradient should be applied to earning call net, i.e., the reward of n-net gradient applied to e-net using counter-factual rewards.

For a piece of news articles n, usually the headline and first paragraph, that may or may not timely align with a piece of earning call e, both in the form of token sequences, the system defines the following input settings:
 1) n only as an input sequence, train on self-supervision target, such as masked language modeling and next sentence prediction, and generate loss $L_w(n)$ given BERT encoder's weights w; Generally, $L(n)$ or $L_w(n)$ refers to loss function of model trained with new articles n as input or input sequence.
 2) e only as an input sequence, train on task target such as analyst's rating change, and incur a loss $L_w(e)$; "w" here represents trained BERT's network weight; $L(e)$ or $L_w(e)$ refers to loss function of model trained with earnings calls, e, as input or input sequence with respect to weights.
 3) e and n are concatenated; model trained with concatenated input or input sequence, ne, produce the earning call prediction loss $L_w(ne)$ or $L(ne)$ with respect to weights.

Next, the system obtains the gradient of inputs, $\nabla_n L(e)$, $\nabla_n L(ne)$, and learns how much help n provided to increase the usage of e to make a final decision. Gradient of inputs refers to the sensitivity of loss function of a model with respect to the model's input. Here, subscript "n" appearing in the notation, $\nabla_n L(e)$, is an input or input sentence to the model that used earnings call, e, as input for training. The gradient of input, expressed as $\nabla_n L(e)$, also expressed as a gradient of a loss function of a model toward or with respect to its input, is the sensitivity of the model's loss function with respect to the model's input. Similarly, in the notation, $\nabla_n L(ne)$, subscript "n" is an input or input sentence to the model that used concatenated earnings call (e) and news article (n). Using the obtained gradient of inputs (sensitivity of loss functions to inputs), the system updates the BERT's network weights w as:

$$w \leftarrow w + \alpha \nabla w \qquad (1)$$

where $$\nabla w = \lambda \nabla_w L(e) + (1-\lambda) \Sigma_{(e,n)} V(\nabla_n L(ne), \nabla_n L(e)) \nabla_w L(n)$$

V is a function that can be understood as a "critic" of the gradient from news, with intuition that useful gradients are incorporated, and less useful ones are discarded. $\alpha$ is a weight value for $\nabla w$ and can be configurable.

V can be many forms, the principle of which is to compare the two gradients such as $$V = \beta \|\nabla_n L(ne) - \nabla_n L(e)\|_2 \qquad (2)$$

where $\beta$ is a scaling factor. Any kernel functions can be applied too. For example, each gradient can converted to a softmax distribution, and inverse –KL divergence can be applied to measure how close they are. The closer, the less information n provides to e.

In an aspect, e is structural, and at least there can be three distinct types of narratives: a) opening remarks, b) analyst questions, and c) company representative's answers. The gradient of input on different sections may indicate how well, and which part, a news aligned with, and thus such structure could provide a guidance on how to value its importance accordingly. For example, if one values the company representative's answers more, then the system can adjust the KL-divergence matrix to put more reward/penalty to that part.

In an aspect, this approach has the advantage that noisy or useless news to earning calls has reduced impact to e representation learning through a soft n selection. And, the e-net is not contaminated by the semantics of news, thus the market decisions can be discerned to come from the earning calls only.

In an embodiment, the system learns with a $\lambda$ schedule, where the system first sets $\lambda=1$ for K learning steps for learning earning call prediction with earning call input e only. After K steps, the system gradually anneals $\lambda$ to 0, until convergence. The convergence is guaranteed since learning on both losses is guaranteed to converge and linear combination of them is also guaranteed to converge.

FIG. 1 is a diagram illustrating components and example method flow in an embodiment for counterfactual learning for earning call analysis. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

Training data for training a machine learning model to predict a stock price or like future financial value can include market data 102 and earning call transcripts 104. Market data 102 can include data such as stock prices, earnings such as quarterly or periodic earnings, and other like financial indicators. Earning call transcripts 104 include speech or text transcripts of what was presented during earnings calls. Such data can be stored on a storage device and/or one or more computer processors 106 can receive such data from one or more data sources over a network, for example, using one or more application programming interface (API) data connectors.

Training a model, augmenting with counter-factual information, and updating the trained model are shown at 108. In an embodiment, a processor may train a neural network 110 such as a BERT model. E-net herein refers to an earnings call transcript network trained using a language model such as BERT. Briefly BERT (Bidirectional Encoder Representations from Transformers) is a machine learning language model for natural language processing (NLP). The neural network 110, e.g., a BERT model, can learn language context of the earnings call data 104 and can be fine-tuned with a classification layer to predict a stock price or another financial indicator based on the language context of the earnings call data and the market data 102. For example, market data 102 and earnings call data 104 are used as ground truth data for correlating stock price with information from an earnings call transcript in training the neural network 110. Such data can pertain to a particular entity whose stock price or like financial performance is being predicted.

The trained neural network 110 can be updated based on augmenting part of the training data, that is, the earnings call data 104, with counterfactual information or data. For example, the earnings call data 104 can be augmented with information from other sources such as news, media, and/or others.

Counterfactual data 112 and knowledge graphs 114 can be stored on one or more storage devices and/or a processor 116 may receive such data over a network, e.g., using one or more APIs and/or data connectors. Counterfactual data 112 can include data such as news and other data from media or from other sources, which can help in predicting a particular or selected entity's stock price or like financial performance. Knowledge graphs 114 can also include data which can be used to augment the training data. Knowledge graph can provide the knowledge to link various entities mentioned from news, commentary notes, and/or others, to earnings call transcripts and provide underlying correlation information between entities and associated stocks.

At 118, a counterfactual example can be selected. For example, a news item, a title from a news item, or first one or more sentences of a news item can be selected. For instance, the entire news, news title, first one or more sentences of a news item can be used.

At 120, the selected counterfactual example is used on e-net, and gradients can be obtained. For example, a language model such as BERT can be trained using counterfactual example only, n (e.g., news, title, one or more sentences in the news) and the model's loss, $L_w(n)$, can be generated. In addition, the earnings call transcripts (e) and counterfactual example (n) are concatenated, and the earning call prediction loss $L_w(ne)$ can be generated. Based on the model's training losses from using these input sequences, gradients of losses can be obtained.

At 122, the counterfactual data's impact can be explained in terms of gradient change, for example, change in training losses with respect to change is counter-factual examples. For example, the gradient of loss difference between the neural network 110 trained with and without the counterfactual data can be computed and based on the amount of the difference, e.g., as described above with reference to Eq. (2), it can be explained whether that counterfactual data has an impact, e.g., whether that counterfactual data is useful augmentation to the earnings call data. In an embodiment, different counterfactual data can be used to determine each counterfactual data's impact on the neural network's prediction accuracy.

At 124, the neural network 110 is updated, e.g., as described above, e.g., with reference to Eq. (1) and Eq. (2). For example, the parameters (e.g., weight) of the neural network 110 can be updated based on the loss gradients of the selected impactful counterfactual data.

In an embodiment, the neural network can be trained to output a stock value and its movement, e.g., an indication of a trend in the stock price, e.g., increasing, decreasing, staying the same, x quarter ahead of consensus change, x quarter ahead of volatility forecasting, x quarter ahead of earning forecasting, x days ahead of volatilities change.

The updated neural network (e.g., at 124) can then be used to perform a prediction. For example, a user interface on a computer device 126 or the like can allow a user to select an entity or firm 128 whose stock value indications are to be predicted. The user may also select one or more stock value indicators 130, e.g., consensus change, volatility, earning, and/or another financial indicator. The updated neural network at 124 is then run to predict the values, e.g., consensus change for a selected horizon for firmA 132, volatility for a selected horizon for firmA 134, earning for a selected horizon for firmB 136, 7-day volatility for firmB 138. In an embodiment, the model can be trained separately or trained as multi-label learning model. The consensus change indicator, for example, estimates earning change prediction, e.g., positive, negative, no change. The predicted information can be provided to a user, for example, on a user interface on a processor 142, for example, via an API 140, which can communicate with the neural network. For example, the API 140 may take the input of standard data format and user selected stock value indicators to call the trained model(s) to generate the prediction of user selected stock indicators and pass the result to the user interface. The processor running the user interface (e.g., referred to as earning call analysis user interface (UI)) at 126 and 140 can be the same processor or a different processor. For instance, an earning call analytics system including such earning call analysis user interface in an embodiment can allow end users to select and upload asset list, select asset value metrics and forecasting horizon, and visualize the forecasting results.

Figure 2:
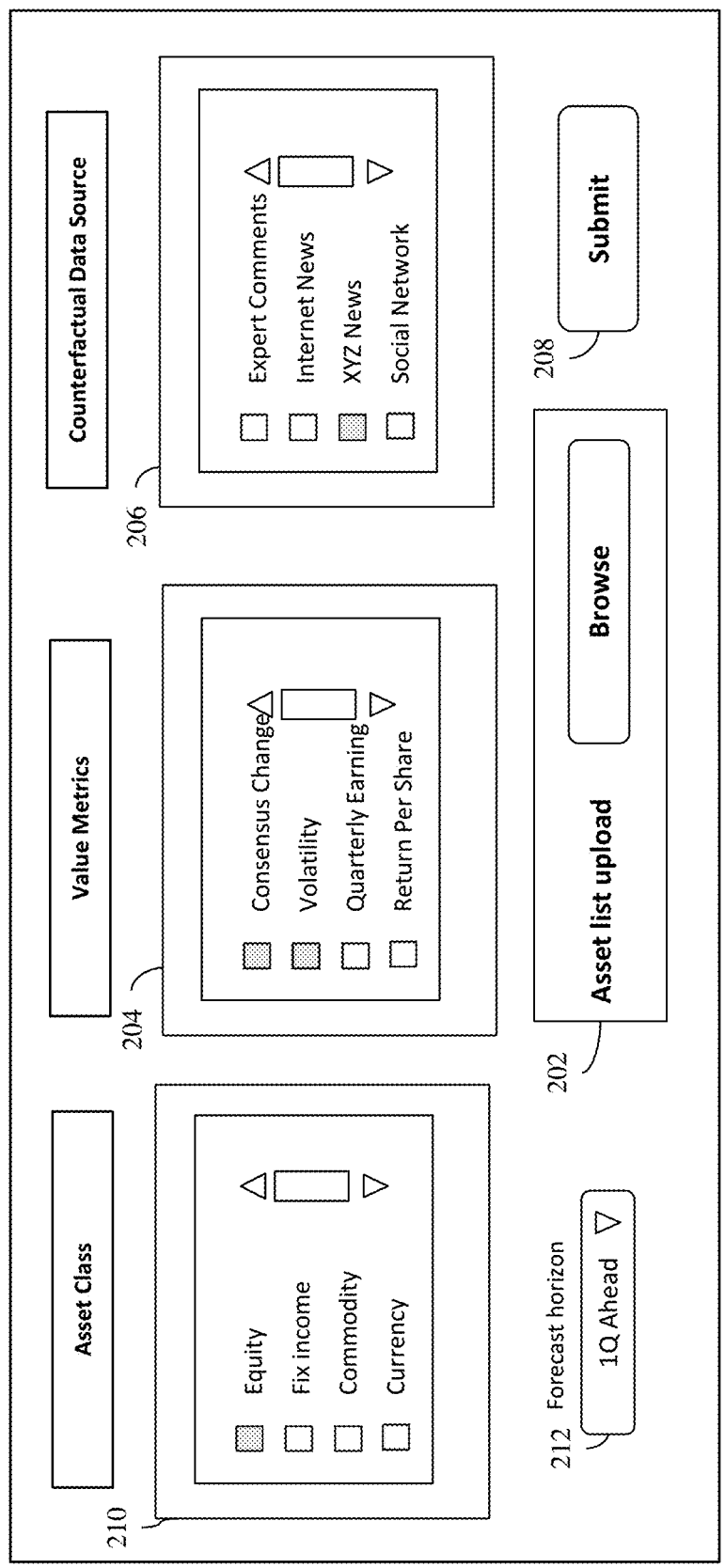
FIG. 2 is a user interface for allowing users to select and upload asset list in an embodiment.

FIG. 2 is a user interface for allowing users to select and upload asset list in an embodiment. The user can upload a list of assets and corresponding asset value metric, counterfactual data source to use, and forecasting horizon, to analyze earing call impact. For instance, a graphical element at 202 allows a user to browse and upload an asset file. For example, to run the train model, the user may select asset class (e.g., equity, stock) and value metrics (e.g., financial indicators to forecast based on earnings call transcripts, such as consensus change, volatility). The user interface may present a window or pane including a list of asset value metrics from which a user may select as shown at 204. The asset value metrics can be selected for the trained model to predict those values. The user interface may also present a window or pane listing counterfactual data sources 206, with which the model may have been trained as augmented information. The counterfactual information is used for weight updates of the trained model. Before updating the trained model, in an embodiment, a user may configure which counterfactual data sources to use for training the model. For example, the model can be trained for each individual and/or the combination of counterfactual data sources. Graphical element at 212 can allow for indicating the forecast horizon, e.g., how far ahead to make a prediction. Clicking on a graphical element, e.g., "submit" button 208, triggers running a machine learning model trained with earnings calls augmented with counterfactual data sources to predict future earnings values or stock values of a selected asset class 210.

The system and/or method in an embodiment can induce counterfactual information to improve analysis of lengthy documents such as earning call transcripts and prediction accuracy. The system and/or method can address a problem of limited training examples in machine learning (e.g., by augmenting the examples with counterfactual information determined to make an impact on the prediction), improve prediction accuracy and improve automated earning call analysis.

Figure 3:
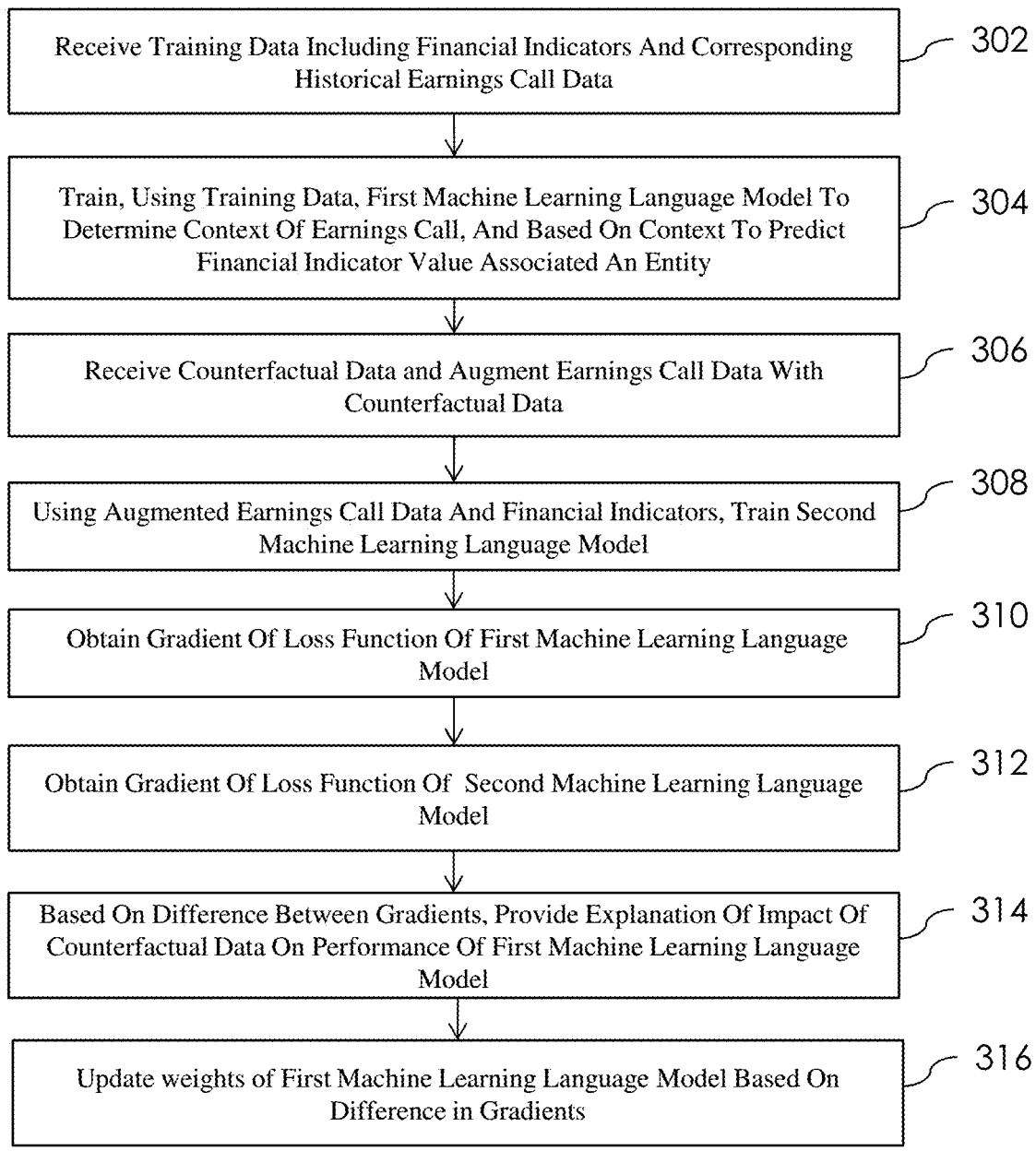
FIG. 3 is a flow diagram illustrating a method in an embodiment for counterfactual learning for earning call analysis.

FIG. 3 is a flow diagram illustrating a method in an embodiment for counterfactual learning for earning call analysis. The method can be performed by or on one or more computer processors. At 302, training data including financial indicators and corresponding earnings call data is received. For example, the financial indicators and corresponding earnings call data can include historical data gathered or collected over time and which indicate relationship or correspondence between the financial indicators and the earnings call data.

At 304, using the training data, a first machine learning language model is trained. The first machine learning language model, for example, is trained to determine the context of an earnings call of associated with an entity and based on the context to predict a financial indicator associated with the entity. For instance, with new input which includes a new earnings call regarding an entity, the trained first machine learning language model can predict a financial indicator such as a stock value of that entity.

At 306, counterfactual data is received and the earnings call data is augmented with the counterfactual data. In an example, a type of counterfactual data can be selected by a user. Counterfactual data can include, but not limited to, news, one or more sentences from news, title from news.

At 308, using the augmented earnings call data and the financial indicators in the training data, a second machine learning language model is trained. Like the first machine learning model, the second machine learning language model is trained to determine the context of an earnings call of associated with an entity and based on the context to predict a financial indicator associated with the entity. For instance, with new input which includes a new earnings call regarding an entity, the trained second machine learning language model can predict a financial indicator such as a stock value of that entity.

At 310, a gradient of the loss function of the first machine learning language model toward or with respect to the input used in the first machine language model is obtained. For instance, an input would include the earnings call or a sentence or text from the earnings call used to train the first machine language model.

At 312, a gradient of loss function of the second machine learning language model toward or with respect to the input used in the second machine language model is obtained. For instance, an input would include the earnings call augmented with the counterfactual data or a sentence or text from this augmented earnings call data used to train the second machine language model.

At 314, based on a difference between the gradient of loss function of the first machine learning language model and the gradient of loss function of the second machine learning language model, an explanation can provided that explains an impact of the counterfactual data on performance of the first machine learning language model. The explanation of the impact of the counterfactual data on the performance of the first machine learning language model can be provided in terms of the gradient.

In an embodiment, at 316, training the first machine learning language model and training the second machine learning language model can be repeated using different counterfactual data, and the counterfactual data determined to have the most impact on the performance of the first machine learning language model can be selected. The first machine learning language model's weights are updated based on the difference between the gradient of loss function of the first machine learning language model with respect to its input and the gradient of loss function of the second machine learning language model with respect to its input.

In an embodiment, the first machine learning language model includes a neural network. In an embodiment, the second machine learning language model includes a neural network. An example of the first machine learning language model includes a Bidirectional Encoder Representations from Transformers (BERT) model.

In an embodiment, the method can also include receiving a user selected entity and a user selected financial indicator and running the first machine learning language model trained with the counterfactual data to predict a future value associated with the user selected financial indicator for the user selected entity.

Figure 4:
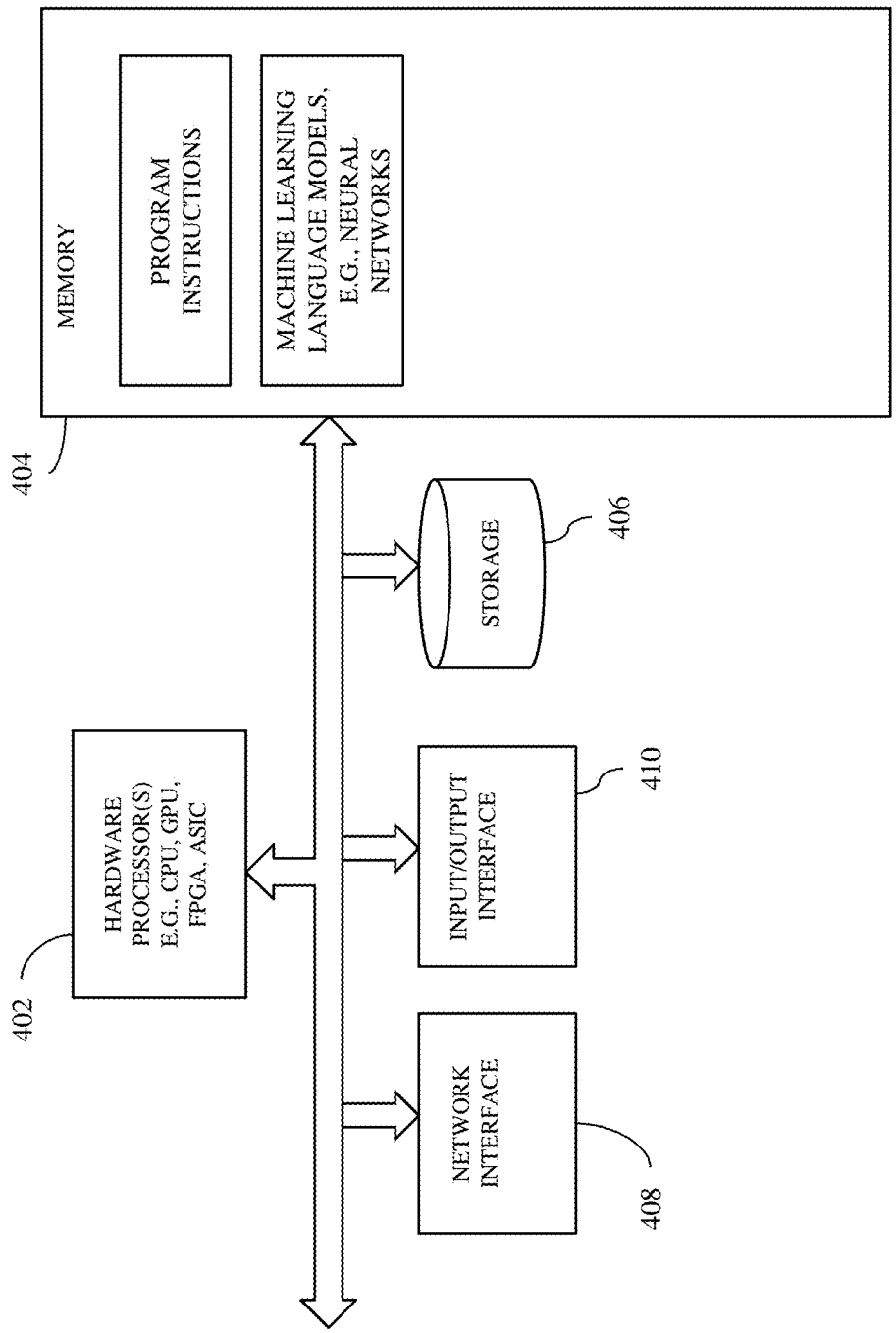
FIG. 4 is a diagram showing components of a system in one embodiment that can train and/or run a machine learning language model such as a neural network model to predict a financial indicator based on an earnings call transcript.

FIG. 4 is a diagram showing components of a system in one embodiment that can train and/or run a machine learning language model, e.g., a neural network model to predict a financial indicator based on an earnings call transcript. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and train a prediction model and provide explanation of impact of counterfactual data on training using earnings call data. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402 and may include an operating system and other program of instructions and/or data. One or more hardware processors 402 may receive input including training data. For instance, at least one hardware processor 402 may generate a prediction model that predicts a financial indicator such as a stock price based on earnings call data, e.g., using a machine learning technique. In one aspect, training data may be stored in a storage device 406 or received via a network interface 408 from a remote device, and may be temporarily loaded into a memory device 404 for building or generating the prediction model. The learned prediction model may be stored on a memory device 404, for example, for running by one or more hardware processors 402. One or more hardware processors 402 may be coupled with interface devices such as a network interface 408 for communicating with remote systems, for example, via a network, and an input/output interface 410 for communicating with input and/or output devices such as a keyboard, mouse, display, and/or others.

Figure 5:
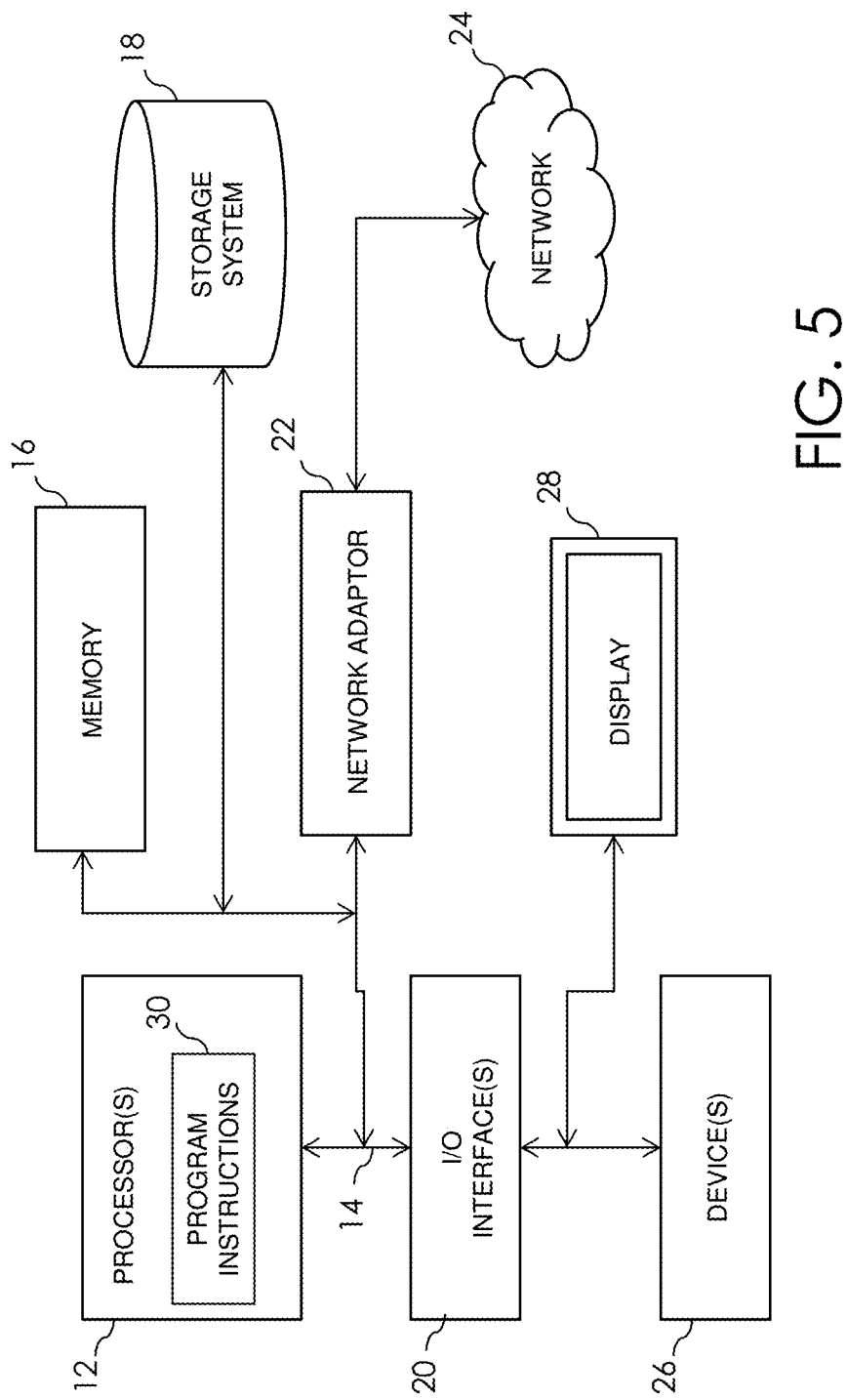
FIG. 5 illustrates a schematic of an example computer or processing system that may implement a system in one embodiment.

FIG. 5 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
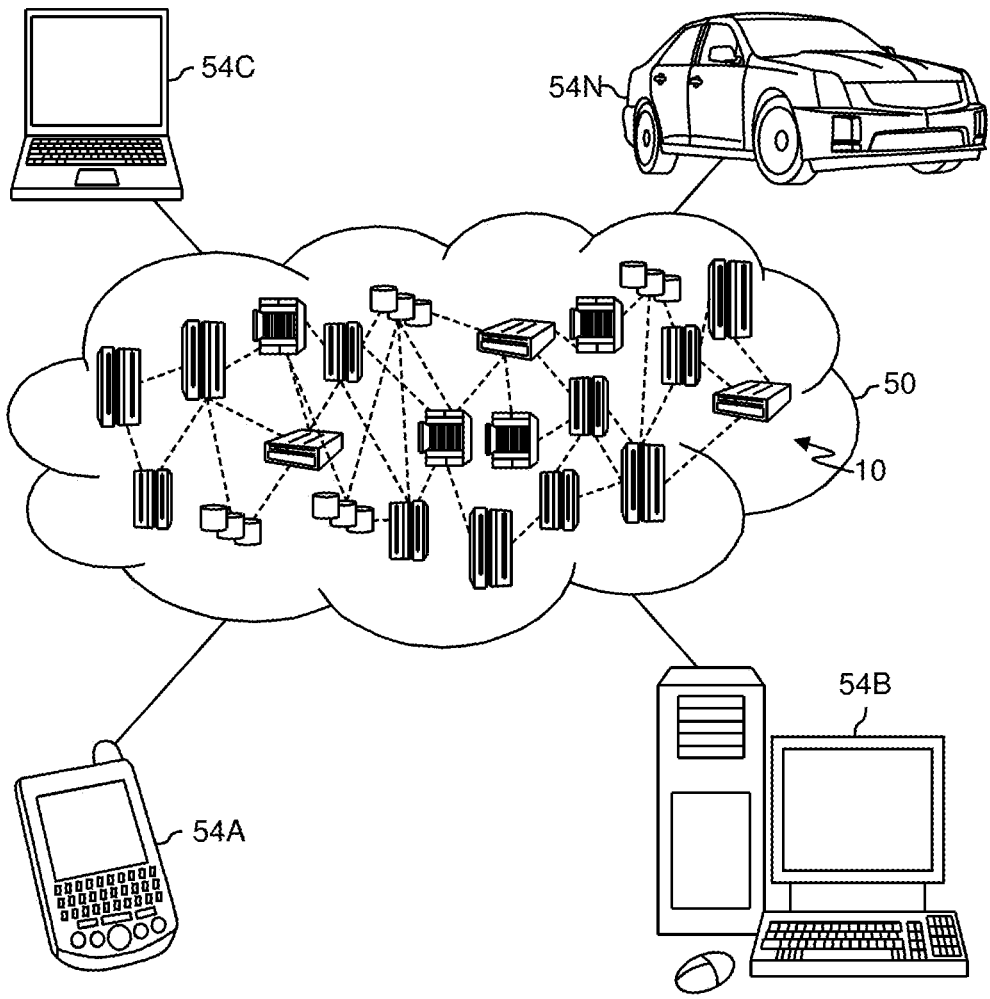
FIG. 6 illustrates a cloud computing environment in one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
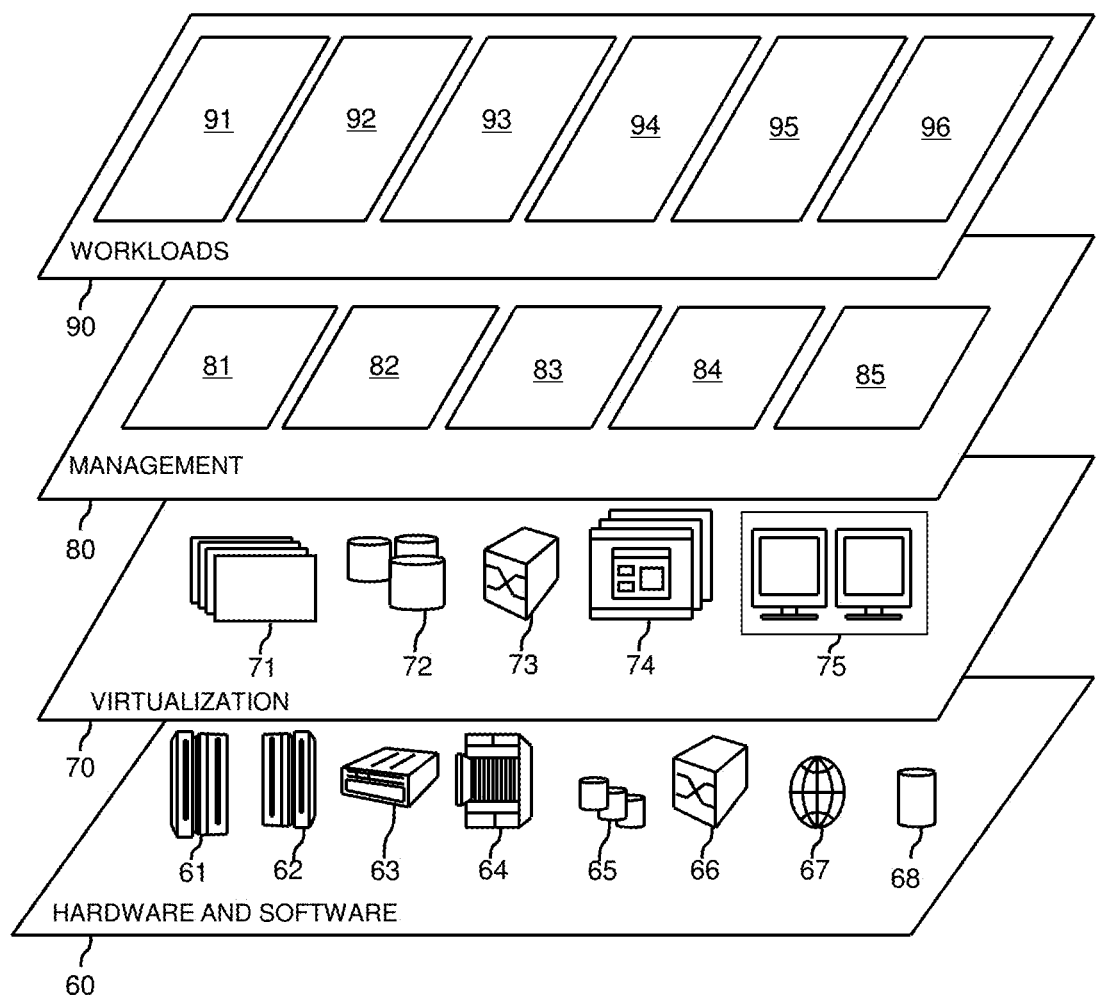
FIG. 7 illustrates a set of functional abstraction layers provided by cloud computing environment in one embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and prediction model using earnings call processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving training data including financial indicators and corresponding earnings call data, the earnings call data including speech and text;
training, using the training data, a first machine learning language model to determine language context of an earnings call associated with an entity and based on the context to predict a financial indicator associated with the entity, the first machine learning language model being fine-tuned with a classification layer to predict the financial indicator associated with the entity;
receiving counterfactual data and augmenting the earnings call data with the counterfactual data;
training, using the augmented earnings call data and the financial indicators in the training data, a second machine learning language model separately from the first machine learning language model;
obtaining a first machine learning language model's gradient of a first machine learning language model's loss function toward input data used in training the first machine learning language model;

obtaining a second machine learning language model's gradient of a second machine learning language model's loss function toward input data of the second machine learning language model;

based on a difference between the first machine learning language model's gradient and the second machine learning language model's gradient, providing an explanation of an impact of the counterfactual data on performance of the first machine learning language model;

updating weights of the first machine learning language model by adding a weighted value of a weight gradient, wherein the weight gradient is computed based on a sum of a fraction of the first machine learning language model's gradient and one minus the fraction of a product between a third machine learning model's gradient and an L2 norm of a difference between the first machine learning language model's gradient and the second machine learning language model's gradient, the fraction being configurable, and a third machine learning model being trained using the counterfactual data, wherein information sharing is performed between the first machine learning language model and the second machine learning language model by gradients that facilitate attention transfer.

2. The method of claim 1, wherein training the second machine learning language model is repeated using different counterfactual data, and the counterfactual data determined to have most impact on the performance of the first machine learning language model is selected, and the first machine learning language model's weights are updated based on a difference between the first machine learning language model's gradient and the second machine learning language model's gradient, where the second machine learning language model's gradient is extracted from the second machine learning language model that is trained with the selected counterfactual data.

3. The method of claim 1, wherein the first machine learning language model includes a neural network.

4. The method of claim 1, wherein the first machine learning language model includes a Bidirectional Encoder Representations from Transformers (BERT) model.

5. The method of claim 1, further including receiving a user selected entity and a user selected financial indicator, and running the first machine learning language model trained with the counterfactual data to predict a future value associated with the user selected financial indicator for the user selected entity.

6. The method of claim 1, the explanation of the impact of the counterfactual data on the performance of the first machine learning language model is provided in terms of a gradient difference.

7. A system comprising:
a processor;
a memory device coupled with the processor;
the processor configured to:
receive training data including financial indicators and corresponding earnings call data, the earnings call data including speech and text;
train, using the training data, a first machine learning language model to determine context of an earnings call associated with an entity and based on the context to predict a financial indicator associated with the entity, the first machine learning language model being fine-tuned with a classification layer to predict the financial indicator associated with the entity;
receive counterfactual data and augment the earnings call data with the counterfactual data;
train, using the augmented earnings call data and the financial indicators in the training data, a second machine learning language model separately from the first machine learning language model;
obtain a first machine learning language model's gradient of a first machine learning language model's loss function with respect to input data used in training the first machine learning language model;
obtain a second machine learning language model's gradient of a second machine learning language model's loss function with respect to input data of the second machine learning language model;
based on a difference between the first machine learning language model's gradient and the second machine learning language model's gradient, provide an explanation of an impact of the counterfactual data on performance of the first machine learning language model;
update weights of the first machine learning language model by adding a weighted value of a weight gradient, wherein the weight gradient is computed based on a sum of a fraction of the first machine learning language model's gradient and one minus the fraction of a product between a third machine learning model's gradient and an L2 norm of a difference between the first machine learning language model's gradient and the second machine learning language model's gradient, the fraction being configurable, and a third machine learning model being trained using the counterfactual data,
wherein information sharing is performed between the first machine learning language model and the second machine learning language model by gradients that facilitate attention transfer.

8. The system of claim 7, wherein the processor is configured to repeat training the second machine learning language model using different counterfactual data, and the counterfactual data determined to have most impact on the performance of the first machine learning language model is selected, and the first machine learning language model's weights are updated based on a difference between the first machine learning language model's gradient and the second machine learning language model's gradient, where the second machine learning language model's gradient is extracted from the second machine learning language model that is trained with the selected counterfactual data.

9. The system of claim 7, wherein the first machine learning language model includes a neural network.

10. The system of claim 7, wherein the first machine learning language model includes a Bidirectional Encoder Representations from Transformers (BERT) model.

11. The system of claim 7, wherein the processor is configured to receive a user selected entity and a user selected financial indicator, and to run the first machine learning language model trained with the counterfactual data to predict a future value associated with the user selected financial indicator for the user selected entity.

12. The system of claim 7, wherein the processor is configured to provide the explanation of the impact of the counterfactual data on the performance of the first machine learning language model in terms of a gradient difference.

13. A computer program product comprising a computer readable storage medium having program instructions embodied therewith, the program instructions readable by a device to cause the device to:
- receive training data including financial indicators and corresponding earnings call data, the earnings call data including speech and text;
- train, using the training data, a first machine learning language model to determine context of an earnings call associated with an entity and based on the context to predict a financial indicator associated with the entity, the first machine learning language model being fine-tuned with a classification layer to predict the financial indicator associated with the entity;
- receive counterfactual data and augmenting the earnings call data with the counterfactual data;
- train, using the augmented earnings call data and the financial indicators in the training data, a second machine learning language model separately from the first machine learning language model;
- obtain a first machine learning language model's gradient of a first machine learning language model's loss function toward input data of the first machine learning language model;
- obtain a second machine learning language model's gradient of a second machine learning language model's loss function toward input data of the second machine learning language model;
- based on a difference between the first machine learning language model's gradient and the second machine learning language model's gradient, provide an explanation of an impact of the counterfactual data on performance of the first machine learning language model;
- update weights of the first machine learning language model by adding a weighted value of a weight gradient, wherein the weight gradient is computed based on a sum of a fraction of the first machine learning language model's gradient and one minus the fraction of a product between a third machine learning model's gradient and an L2 norm of a difference between the first machine learning language model's gradient and the second machine learning language model's gradient, the fraction being configurable, and a third machine learning model being trained using the counterfactual data.

14. The computer program product of claim 13, wherein the device is caused to repeat training the second machine learning language model using different counterfactual data, and the counterfactual data determined to have most impact on the performance of the first machine learning language model is selected, and the first machine learning language model's weights are updated based on a difference between the first machine learning language model's gradient and the second machine learning language model's gradient, where the second machine learning language model's gradient is extracted from the second machine learning language model that is trained with the selected counterfactual data.

15. The computer program product of claim 13, wherein the first machine learning language model includes a neural network.

16. The computer program product of claim 13, wherein the first machine learning language model includes a Bidirectional Encoder Representations from Transformers (BERT) model.

17. The computer program product of claim 13, wherein the device is caused to receive a user selected entity and a user selected financial indicator, and to run the first machine learning language model trained with the counterfactual data to predict a future value associated with the user selected financial indicator for the user selected entity.

18. The computer program product of claim 13, wherein the device is caused to provide the explanation of the impact of the counterfactual data on the performance of the first machine learning language model in terms of a gradient difference.

19. The computer program product of claim 13, further including updating the weights of the first machine learning language model using the difference between the first machine learning language model's gradient and the second machine learning language model's gradient.

* * * * *